United States Patent
Shioda et al.

[11] Patent Number: 5,804,333
[45] Date of Patent: *Sep. 8, 1998

[54] COIN SHAPED LITHIUM BATTERY

[75] Inventors: Masatsugu Shioda; Koichi Miyoda, both of Fukushima, Japan

[73] Assignee: Sony Corporation, Tokyo, Japan

[ * ] Notice: The term of this patent shall not extend beyond the expiration date of Pat. No. 5,629,107.

[21] Appl. No.: 829,329

[22] Filed: Mar. 31, 1997

Related U.S. Application Data

[63] Continuation of Ser. No. 591,954, Jan. 23, 1996, Pat. No. 5,629,107, which is a continuation of Ser. No. 361,662, Dec. 22, 1994, abandoned.

[30] Foreign Application Priority Data

Dec. 29, 1993 [JP] Japan ..................................... 5-355375

[51] Int. Cl.⁶ ............................. H01M 4/04; H01M 10/38
[52] U.S. Cl. ............................ 429/128; 429/66; 429/162; 429/224
[58] Field of Search ............................. 429/128, 66, 162, 429/224

[56] References Cited

U.S. PATENT DOCUMENTS

Re. 31,413 10/1983 Jaggard .
2,812,377 11/1957 Franquemont .
3,981,748 9/1976 Margalit .
4,020,242 4/1977 Okazaki et al. .
4,121,020 10/1978 Epstein et al. .
4,121,021 10/1978 Ogawa et al. .
5,346,783 9/1994 Tomantschger et al. .
5,432,027 7/1995 Tuttle et al. .
5,486,431 1/1996 Tuttle et al. .
5,629,107 5/1997 Shioda et al. ........................... 429/128

OTHER PUBLICATIONS

Webster's II new Riverside university dictionary, Riverside Publishing Company, 1988, p. 339 (No Month Available).

Primary Examiner—Prince Willis, Jr.
Assistant Examiner—Carol Chaney
Attorney, Agent, or Firm—Hill & Simpson

[57] ABSTRACT

A coin-shaped lithium battery is disclosed. The coin-shaped lithium battery comprises a battery can containing therein an anode pellet composed of lithium or lithium alloy and a cathode pellet which are arranged to face each other with a separator provided between the pellets. At least one of the anode pellet and the cathode pellet has its central part swollen to form a curved surface. The battery can is elastically deformed to be aligned with the curved surface. In the coin-shaped lithium battery, total height of the anode pellet and the cathode pellet in outer rim part is smaller than total height in central part by 4 to 12%.

1 Claim, 4 Drawing Sheets

COIN SHAPED LITHIUM BATTERY

This is a continuation of application Ser. No 08/591.954, filed Jan. 23, 1996, now U.S. Pat. No. 5,629,107, which is in turn a Continuation of Ser. No. 08/361,662, filed Dec. 22, 1994, now abandoned.

BACKGROUND OF THE INVENTION

This invention relates to a coin-shaped lithium battery constituted by a battery can containing therein an anode pellet composed of lithium or lithium alloy and a cathode pellet which are arranged to face each other with a separator provided between them.

In the coin-shaped lithium battery constituted by a battery can containing therein an anode pellet composed of lithium or lithium alloy and a cathode pellet which are arranged to face each other with a separator provided between them, such as a coin-shaped lithium manganese battery, the anode material, that is, the anode pellet composed of lithium or lithium alloy decreases in volume, and the cathode material, that is, the cathode pellet increases in volume as the battery discharges. The decrease in height of the anode pellet and the increase in height of the cathode pellet are not equal, reducing the total height of the anode pellet and the cathode pellet. Consequently, contact of the battery can, the anode pellet and the cathode pellet with one another, that is, contact between anode and cathode cannot be maintained satisfactorily in the latter half of discharge, and hence the unsatisfactory contact causes a significant increase in internal pressure and discharge failure.

In a conventional coin-shaped lithium manganese battery constituted by a battery can 44 containing therein parallel disc-shaped anode pellet 41 and cathode pellet 42 facing each other with a separator 43 between them, an anode cap 45 and a cathode can 46 forming the battery can 44 are caulked with an insulation sealing gasket 47 provided between them, and the anode cap 45 is elastically deformed, as shown in FIG. 1. In the coin-shaped lithium manganese battery of this structure, hereinafter referred to as Conventional Example 1, the decrease in height of the active material in the course of discharge causes the anode cap 45 to elastically deform, so that satisfactory contact between anode and cathode is maintained.

In another conventional coin-shaped lithium manganese battery constituted by a battery can 54 containing therein an anode pellet 51 and a cathode pellet 52 facing each other with a separator 53 between them, the cathode pellet 52 is fitted into a cathode ring 55, as shown in FIG. 2. In the coin-shaped lithium manganese battery of this structure, hereinafter referred to as Conventional Example 2, the cathode ring 55 limits the change in volume of the cathode pellet 52 in the course of discharge, to the vertical direction. Thus, the reduction in the total height of the anode pellet 51 and the cathode pellet 52 during discharge is prevented.

In addition, another coin-shaped lithium manganese battery, hereinafter referred to Conventional Example 3, has been proposed. This coin-shaped lithium manganese battery of Conventional Example 3 has a thinner battery can 64 which contains therein an anode pellet 61 of greater diameter than that of Conventional Example 1 and a cathode pellet 62 facing each other with a separator 63 between them, as shown in FIG. 3.

With above-described conventional coin-shaped lithium manganese batteries, internal resistance R1 prior to discharge and internal resistance R2 after discharge of 80% of nominal capacity were measured. The results are shown in Table 1.

TABLE 1

| Battery | Nominal Capacity | Discharge Capacity | Internal Resistance R1 | Internal Resistance R2 |
|---|---|---|---|---|
| Conventional Example 1 | 190 mAh | 191 mAh | 8 Ω | 63 Ω |
| Conventional Example 2 | 190 mAh | 193 mAh | 8 Ω | 20 Ω |
| Conventional Example 3 | 220 mAh | 228 mAh | 7 Ω | 101 Ω |

The coin-shaped lithium manganese battery of Conventional Example 1 has a problem such that internal resistance increases in the latter half of discharge, as shown in Table 1. This increase in internal resistance in the latter half of discharge indicates that the battery in practical use has its discharge voltage reduced when heavy load which deteriorates battery properties particularly at low temperatures is imposed on the battery. Consequently, equipments using this battery may not operate normally.

The coin-shaped lithium manganese battery of Conventional Example 2 requires the cathode ring 55, and thus has problems of increase in the number of component parts and hence increase in costs.

The coin-shaped lithium manganese battery of Conventional Example 3, though having a greater capacity than in Conventional Example 1, has problems of larger increase in internal resistance in the latter half of discharge and deterioration of performance by heavy load particularly at low temperatures.

OBJECT AND SUMMARY OF THE INVENTION

In view of the above-described status of the art, it is an object of the present invention to provide a coin-shaped lithium battery which is capable of maintaining satisfactory contact of anode with cathode even in the latter half of discharge without causing an increase in the number of component parts, and exhibiting satisfactory discharge properties as well as low costs.

To achieve the above-mentioned object, the present inventors have found a structure in which the central part of at least an anode pellet and a cathode pellet is swollen to maintain satisfactory contact of anode with cathode in the latter half of discharge by utilizing elasticity of the battery can.

The present invention has been completed in view of the above. According to the present invention, there is provided a coin-shaped lithium battery having a battery can containing therein an anode pellet composed of lithium or lithium alloy and a cathode pellet facing each other with a separator provided between them, at least one of the anode pellet and the cathode pellet having its central part swollen to form a curved surface, the battery can being elastically deformed to be aligned with the curved surface.

To elastically deform the battery can, one or both sides of the anode pellet may be made curved surfaces, or one or both sides of the cathode pellet may be made curved surfaces. Also, one side of the anode pellet and one side of the cathode pellet, both sides of the anode pellet and one side of the cathode pellet, one side of the anode pellet and both sides of the cathode pellet, or both sides of the anode pellet and both sides of the cathode pellet may be made curved surfaces.

The curved surface in this case may be spherical or paraboloidal.

With the curved surface, it is preferred that the total height of the anode pellet and the cathode pellet in the outer rim part is smaller than the total height in the central part by 4 to 12%.

Thus, as the coin-shaped lithium battery of the present invention has its battery can elastically deformed to be aligned with the curved surface produced by swelling the central part of at least one of the anode pellet and the cathode pellet, satisfactory contact of anode with cathode can be maintained by the elasticity. Therefore, the increase in internal resistance at the end of discharge can be effectively prevented.

Also, as the coin-shaped lithium battery of the present invention has the total height of the anode pellet and cathode pellet in the outer rim part smaller than the total height in the central part by 4 to 12%, the discharge capacity can be secured and the increase in internal resistance in the latter half of discharge can be effectively prevented.

Thus, according to the present invention, the coin-shaped lithium battery which is capable of maintaining satisfactory contact of anode with cathode without increasing the number of component parts, and exhibiting satisfactory discharge properties, high capacity and low costs.

DESCRIPTION OF THE PREFERRED EMBODIMENTS

Preferred embodiments of the coin-shaped lithium battery according to the present invention will now be described with reference to the attached drawings.

EXAMPLE 1

Figure 1:
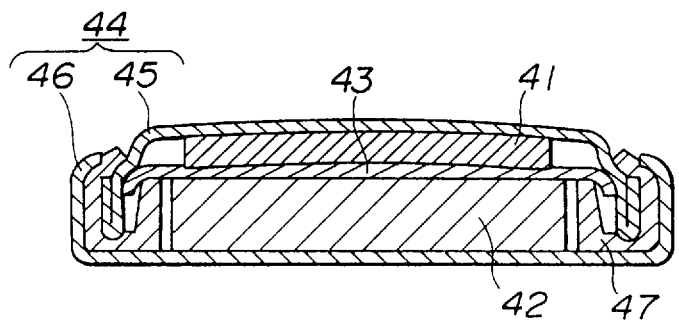
FIG. 1 is a cross-sectional view showing essential portions of the structure of a coin-shaped lithium manganese battery in Conventional Example 1.
Figure 2:
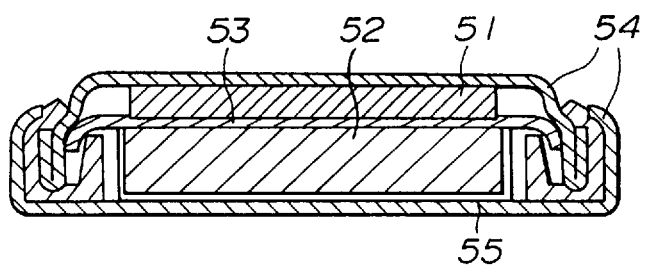
FIG. 2 is a cross-sectional view showing essential portions of the structure of a coin-shaped lithium manganese battery in Conventional Example 2.
Figure 3:
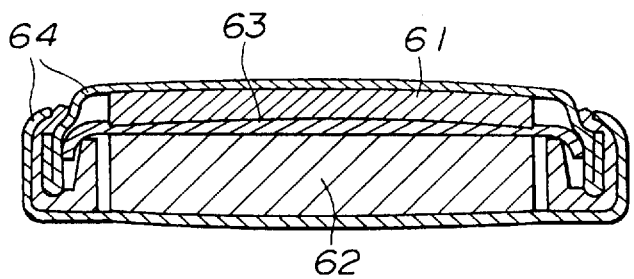
FIG. 3 is a cross-sectional view showing essential portions of the structure of a coin-shaped lithium manganese battery in Conventional Example 3.
Figure 4:
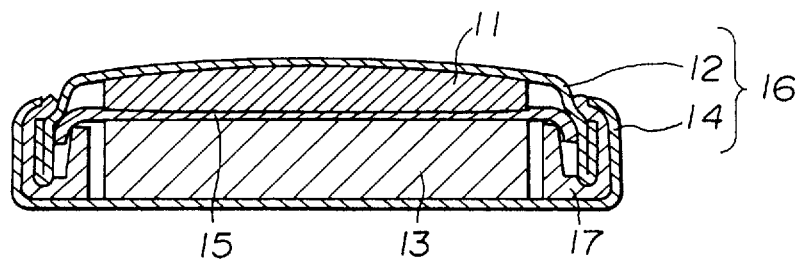
FIG. 4 is a cross-sectional view showing essential portions of the structure of a coin-shaped lithium manganese battery in Example 1 of the present invention.

FIG. 4 shows a coin-shaped lithium manganese battery of Example 1. In this Example 1, an anode pellet 11 has its one side curved, to have its outer rim part thinner than the central part by 0.22 mm.

Figure 5:
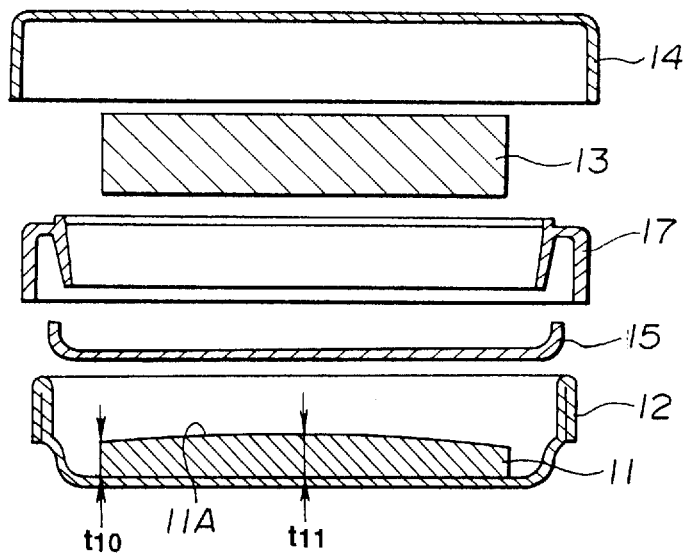
FIG. 5 is an exploded view of the coin-shaped lithium manganese battery of Example 1.

The coin-shaped lithium manganese battery of Example 1 is constructed as shown in an exploded view of FIG. 5. That is, the anode pellet 11 is made up of molded metallic lithium having its one side 11A curved to have the thickness $t_{10}$ in the outer rim part smaller than the thickness $t_{11}$ in the central part by 0.22 mm, and having the other side on an anode cap 12 flattened. Then, a separator 15 is put on the anode pellet 11, with an insulation sealing gasket 17 fitted therein. An electrolyte and a normal parallel disc-shaped cathode pellet 13 are entered, covered with a cathode can 14. The anode cap 12 and the cathode can 14 are caulked with the insulation sealing gasket 17 provided between them, so that the anode cap 12 is elastically deformed to substantially flatten the inner surface of the anode pellet 11, as shown in FIG. 4.

EXAMPLE 2

Figure 6:
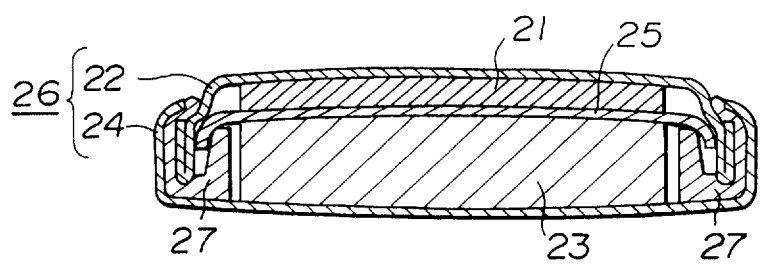
FIG. 6 is a cross-sectional view showing essential portions of the structure of a coin-shaped lithium manganese battery in Example 2 of the present invention.

FIG. 6 shows a coin-shaped lithium manganese battery of Example 2. In this Example 2, a cathode pellet 23 has its both sides 23A, 23B curved, to have the peripheral part thinner than the central part by 0.22 mm.

Figure 7:
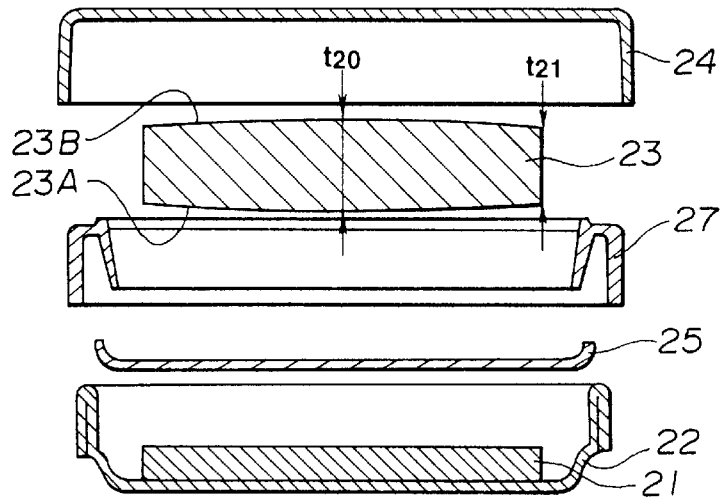
FIG. 7 is an exploded view of the coin-shaped lithium manganese battery of Example 2.

The coin-shaped lithium manganese battery of Example 2 is constructed as shown in an exploded view of FIG. 7. That is, an anode pellet 21 is formed in a normal parallel disc shape of molded metallic lithium on an anode cap 22. Then, a separator 25 is put on the anode pellet 21, with an insulation sealing gasket 27 fitted therein. An electrolyte and the cathode pellet 23 having the thickness $t_{21}$ in the outer rim part smaller than the thickness $t_{20}$ in the central part by 0.22 mm are entered, covered with a cathode can 24. The anode cap 22 and the cathode can 24 are caulked with the insulation sealing gasket 27 provided between them, so that the anode cap 22 and the cathode can 24 are elastically deformed to be aligned with curved surface of the cathode pellet 23, as shown in FIG. 6.

EXAMPLE 3

Figure 8:
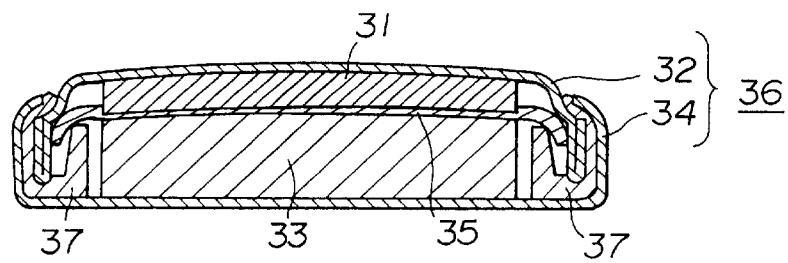
FIG. 8 is a cross-sectional view showing essential portions of the structure of a coin-shaped lithium manganese battery in Example 3 of the present invention.

FIG. 8 shows a coin-shaped lithium manganese battery of Example 3. In this Example 3, an anode pellet 31 has its one side 31A curved and a cathode pellet 33 has its both sides 33A, 33B curved, to have the outer rim part thinner than the central part by 0.22 mm.

Figure 9:
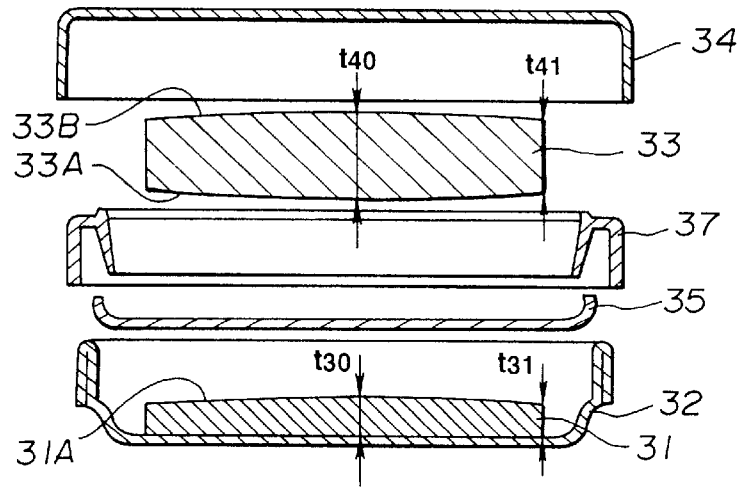
FIG. 9 is an exploded view of the coin-shaped lithium manganese battery of Example 3.

The coin-shaped lithium manganese battery of Example 3 is constructed as shown in an exploded view of FIG. 9. That is, the anode pellet 31 is made up of molded metallic lithium having its one side 31A curved to have the thickness $t_{31}$ in the outer rim part smaller than the thickness $t_{30}$ in the central part, and having the other side on an anode cap 32 flattened. Then, a separator 35 is put on the anode pellet 31, with an insulation sealing gasket 37 fitted therein. An electrolyte and the cathode pellet 33 having the thickness $t_{41}$ in the outer rim part smaller than the thickness $t_{40}$ in the central part are entered, covered with a cathode can 34. The anode cap 32 and the cathode can 34 are caulked with the insulation sealing gasket 37 provided between them, so that the anode cap 32 and the cathode can 34 are elastically deformed to be aligned with curved surfaces of the anode pellet 31 and the cathode pellet 33, respectively, as shown in FIG. 8. The sum $(t_{30}+t_{40})$ of the thicknesses $t_{30}$ and $t_{40}$ in the central parts of the anode pellet 31 and the cathode pellet 33 is greater than the sum $(t_{31}+t_{41})$ of the thicknesses $t_{3l}$ and $t_{41}$ in the outer rim parts by 0.22 mm.

With the coin-shaped lithium manganese batteries of Example 1, Example 2 and Example 3, internal resistance R1 prior to discharge and internal resistance R2 after 80% discharge of nominal capacity 220 mAh were measured. The results are shown in Table 2 in comparison with Conventional Example 3.

TABLE 2

| Battery | Discharge Capacity | Internal Resistance R1 | Internal Resistance R2 |
|---|---|---|---|
| Example 1 | 228 mAh | 7 Ω | 22 Ω |
| Example 2 | 227 mAh | 7 Ω | 20 Ω |
| Example 3 | 228 mAh | 7 Ω | 19 Ω |
| Conventional Example 3 | 228 mAh | 7 Ω | 101 Ω |

As is clear from the measurement results shown in Table 2, the increase in internal resistance at the end of discharge was effectively prevented with the coin-shaped lithium manganese batteries of Examples 1 to 3, compared with the coin-shaped lithium manganese battery of Conventional Example 3. Thus, the increase in internal resistance at the end of discharge can be effectively prevented with any of the batteries of Example 1 in which the central part of the anode pellet 11 is swollen to form a curved surface, Example 2 in which the central part of the cathode pellet 23 is swollen to form a curved surface, and Example 3 in which the central parts of the anode pellet 31 and the cathode pellet 33 are swollen to form curved surfaces. That is, in the present invention, at least one of the anode pellet and the cathode pellet has its central part swollen into a curved surface, to elastically deform the battery can to be along with the curved surface. Thus, the increase in internal resistance at the end of discharge can be effectively prevented.

In Example 1 in which the central part of the anode pellet 11 is swollen into a curved surface, discharge capacity and internal resistance R2 after 80% discharge of nominal capacity 220 mAh were measured with the height of the anode pellet 11 changed between the central part and the outer rim part by a rate of 0 to 14%. The results are shown in Table 3 and FIG. 10.

TABLE 3

| Rate of Difference in Height | Discharge Capacity | Internal Resistance R2 |
|---|---|---|
| 0% | 228 mAh | 102 Ω |
| 2% | 227 mAh | 42 Ω |
| 4% | 228 mAh | 28 Ω |
| 6% | 226 mAh | 20 Ω |
| 8% | 223 mAh | 20 Ω |
| 10% | 219 mAh | 21 Ω |
| 12% | 216 mAh | 27 Ω |
| 14% | 211 mAh | 35 Ω |

Figure 10:
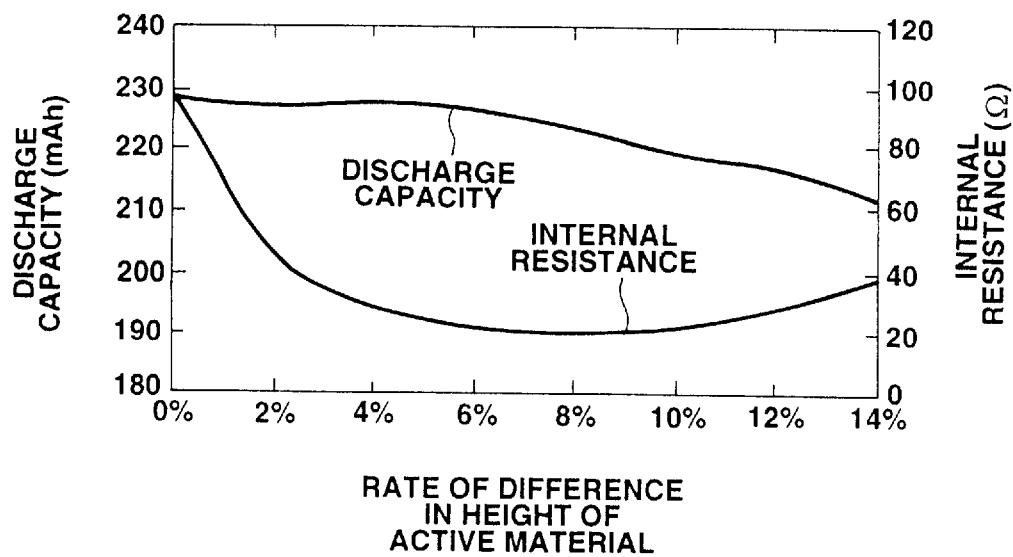
FIG. 10 is a view showing results of measuring discharge capacity and internal resistance after discharge of the coin-shaped lithium manganese battery of Example 1, with the height of the anode pellet being changed between the central part and the outer rim part by 0 to 14%.

As is clear from Table 3 and FIG. 10, with the rate of difference in height between the central part and the outer rim part varying in a range of 4 to 12%, discharge capacity can be secured and the increase in internal resistance in the latter half of discharge can be effectively prevented.

What is claimed is:

1. A coin-shaped lithium battery comprising:

a battery can containing therein an anode pellet comprising lithium or a lithium alloy and a cathode pellet comprising manganese dioxide, said anode pellet and said cathode pellet being arranged to face each other with a separator provided between the pellets, said separator having a substantially planar configuration prior to assembly;

the anode pellet including at least one curved surface and the cathode pellet having its central part swollen to form a pair of opposed curved surfaces, each said curved surface being spherical or paraboloidal; and the battery can being deformed to be aligned with at least one of said curved surfaces, whereby a lithium battery whose internal resistance as measured after 80% discharge of nominal capacity of about 220 mAh is less than or equal to 28 Ω is provided.

* * * * *